UNITED STATES PATENT OFFICE.

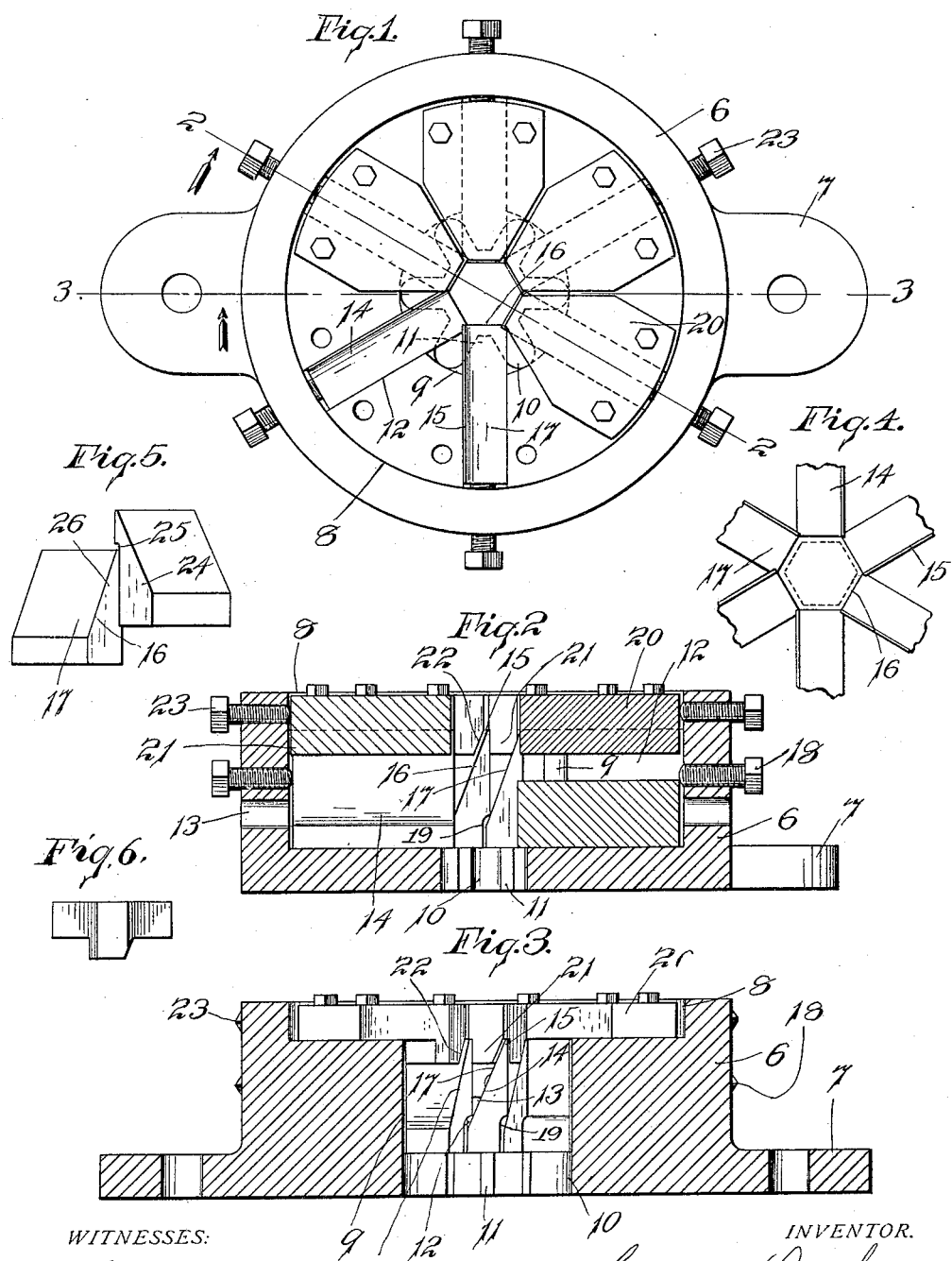

GEORGE DUNHAM, OF UNIONVILLE, CONNECTICUT, ASSIGNOR TO CHARLES H. OSBORNE, OF NEW YORK, N. Y.

METAL-SHAVING APPARATUS.

1,121,003.  Specification of Letters Patent.  Patented Dec. 15, 1914.

Application filed January 9, 1912. Serial No. 670,200.

*To all whom it may concern:*

Be it known that I, GEORGE DUNHAM, a citizen of the United States, and a resident of Unionville, in the county of Hartford and State of Connecticut, have invented a new and Improved Metal-Shaving Apparatus, of which the following is a specification.

My invention relates generally to the class of metal working devices above set out, and more especially to that class of such devices used for shaving nuts or like articles, and an object of my invention, among others, is to provide a device of this class in the use of which a nut or like article may be quickly shaved or trimmed in a thorough and efficient manner.

One form of device embodying my invention and in the construction and use of which the object above set out, as well as others, may be attained, is illustrated in the accompanying drawings, in which—

Figure 1 is a top view of a device embodying my invention. Fig. 2 is a view in section on plane denoted by dotted line 2—2 of Fig. 1, the blade on the left, however, not being cut in section. Fig. 3 is a view in section on plane denoted by dotted line 3—3 of Fig. 1. Fig. 4 is a detail view illustrating the adjustable feature of the blades or cutters to operate upon different sizes of articles. Fig. 5 is a detail view illustrating a slightly modified form of the device.

In the accompanying drawing the numeral 6 denotes a block or cutter holder of any suitable form and material, as herein shown this block being round and having ears 7 by means of which it may be secured to a table or bed. A recess 8, preferably round, extends from the top of the block for a short distance toward the bottom, which for purposes of description may be considered as that part on which the ears 7 are located. A well 9 extends from the recess 8 downward within the block, and an opening 10 extends from the bottom of the well to the bottom of the block, this opening 10 having points or rests 11 for cutter blades to be hereinafter described. This block is also provided with cutter slots 12 extending preferably radially of the block from the periphery of the recess 8 into the well 9. Relief openings 13 are formed through the end walls of the slots 12 to provide for the clearance of chips or the like that may accumulate in the operation of the device. Cutter blades 14 are located in the slots 12 and with their ends extending into the well 9. These blades are beveled from the top or edge 15 to a wider dimension near the bottom, the angle between the end of the blade and the beveled side 17 forming a cutting edge 16 obliquely disposed to the direction of movement of a nut or similar article in the cutting operation, so that in the operation of the blades a shearing cut will be given to the nut or like article. The slots for the blades and the blades are preferably of a number equal to the number of sides of the article to be cut or trimmed, the device herein shown being arranged to trim or cut a hexagonal nut or article.

The degree of bevel of the sides 17 will be such as to produce the best results and shear or trim the nut or article to the best advantage leaving as little bur as possible on the top and on the corners, it being evident that different degrees of bevel will be required for different articles, depending upon their composition, form, or the like.

Adjusting screws 18 extend through the walls of the holder and may be employed to back-up the cutters and serve to adjust their position. The sides of the cutter blades opposite to the beveled part may be undercut as at 19, (see Figs. 2 and 3), within which undercut part 19 the end of the beveled side of each cutter may project, so that the cutters will overlap each other, as shown in Fig. 1 of the drawings. This enables a nut of a certain size to be produced, and by drawing the cutters backward to the position shown in Fig. 4 a nut of a larger size may be operated upon.

When the device is used in connection with apparatus for forming nuts the delivery part of said apparatus may be arranged directly over the cutters and serve as a guide for the nuts or like articles to my improved cutting or trimming device. When, on the other hand, it is desired to cut or finish nuts supplied to the cutters independently of a nut forming apparatus, suitable guides may be employed, in the form herein shown these consisting of guide plates 20, (two of which are removed in Fig. 1), seated at the bottom of the recess 8 and secured therein as by screw bolts. Each guide plate has a tongue 21 projecting into the groove over which the guide is located, this tongue being beveled as at 22 to fit upon and rest against the beveled side of the cutter to which the guide is appurtenant, and as shown in Figs. 2 and 3 of the drawings. The ends of each guide will be located at the proper angle with respect to other guides to properly present a nut or like article to the cutter underneath, and adjusting screws 23 may be employed for setting the guides.

While I have shown the preferred disposition of the blades in which the top edges or ridges are located on the same side of their respective slots, in a direction around the holder, they may be differently located, as by reversing some of the blades end for end, each end of the blade being constructed for cutting purposes. In such cases the top edges or ridges of adjacent blades may lie next to each other, as illustrated in Fig. 5 of the drawings, in which one of the blades 24 has the cut-away portion 25 to receive the other blade 26. It will be noted that this overlapping of the ends of the blades, as shown in Fig. 4, provides an opening for the passage of a blank, said opening having continuous walls, that is, there is no space at the points where the corners of the ends of the blades meet. It will be understood that in practical operation, the blades will never be moved back enough to cause a space at the meeting corners of the ends of the blades, but that the opening will always be closed, as shown in Fig. 4, providing what I term an "operative" opening, whereby the ends of the blades will always be of a width greater than that of the side of the nut to be cut thereby.

Applicant has shown and described herein a satisfactory form of device embodying his invention, but this may be changed to a greater or lesser degree and yet be within the spirit and intent of the invention as set forth in the appended claims.

I claim:—

1. A holder, and cutter blades angularly disposed in said holder and converging to a common center, the ends of the blades being formed into cutters and arranged to provide an opening for the passage of an article to be shaved, the blades being thicker than the distance across each of the sides of an article to be shaved and cut away on a side to receive a portion of the adjacent blade.

2. A holder, and cutter blades radially disposed in said holder, the ends of each blade being beveled on one side to form a cutting edge and recessed on the opposite side to receive a portion of an adjacent cutter blade, the ends of the blades being disposed to provide an opening for the passage of an article to be shaved.

3. A holder, and cutter blades angularly disposed in said holder and converging to a common center, the ends of the blades being formed into cutting edges, each end overlapping that of the end of the blade on opposite sides to provide an opening with continuous walls for the passage of an article to be shaved, whereby each blade is thicker than the distance across the operative opening at the end of said blades.

4. A holder, and cutter blades angularly disposed in said holder and converging to a common center, and overlapping to constitute an operative opening with continuous walls each blade being beveled from the top at one side edge and at the end of the blade to form a smooth unbroken cutting edge at the end of the blade obliquely disposed to the passage of an article between the blades, the blades being thicker than the distance across said operative opening at the end of the blades, whereby an article will come in contact with said cutting edge intermediate its ends.

5. A holder having a central well with grooves extending radially therefrom, cutters having their ends formed into cutting edges to shave an article passed through said well, and guide plates located above the cutters and having tongues projecting into the grooves and resting against said cutters.

6. A holder having a central well with grooves radiating therefrom, cutters located in said grooves and each having its side beveled to form a cutting edge, and a guide plate resting over said groove and having a tongue extending thereinto with a beveled edge to fit the beveled edge of the cutter.

7. A holder having grooves relatively angularly disposed and cutter blades of uniform shape located in said grooves and with their ends projecting toward a common center, said cutters being beveled for their entire length on one side at the top and cut away at the opposite side on the bottom, said cut-away portion forming recesses to receive a portion of the beveled part of the adjoining cutter, the ends of the blades forming a straight cutting edge extending obliquely to the direction of movement of the article to be shaved.

8. A holder, cutter blades relatively angularly disposed within said holder with their ends forming an opening for the passage of an article to be shaved, the ends of said cutter being wider than the article to be shaved and each blade having a straight cutting edge obliquely disposed to the direction of travel of the article being shaved, the point of the cutting edge being located at one side of the face being shaved and each blade being cut away on the side opposite preferably to receive the side of the adjoining blade.

9. A holder having a central well with grooves radiating therefrom, clearance openings through the side of the holder and opening from said grooves, and cutters located in said grooves and having one side beveled forming a clearance passage within the groove.

10. A cutter having a beveled cutting edge on one side and a recess on the opposite side adapted to receive the end of a like formed cutter.

11. A cutter having a beveled cutting edge on one side and a recess on its opposite side of a dimension corresponding to the unbeveled edge on the side opposite said recess.

12. A holder, and cutter blades oppositely disposed in said holder and forming a central opening for the passage of an article to be shaved, the ends of said blades being straight and unbroken and disposed in a plane substantially parallel to the axis of said opening thus forming a guide and support for said article, the sides of the blades being beveled to form at the side thereof a cutting edge obliquely disposed to the direction of movement of the article through said opening.

GEORGE DUNHAM.

Witnesses:
ARTHUR B. JENKINS,
EVA L. STOUGHTON.